May 3, 1949. L. L'ESPERANCE ET AL 2,468,884
PROPELLER DOLLY
Filed May 12, 1945 4 Sheets-Sheet 1

Inventors
*Louis L'Esperance*
and *Hubert A. Schneider*

By *Clarence A. O'Brien
and Harvey B. Jacobson*
Attorneys

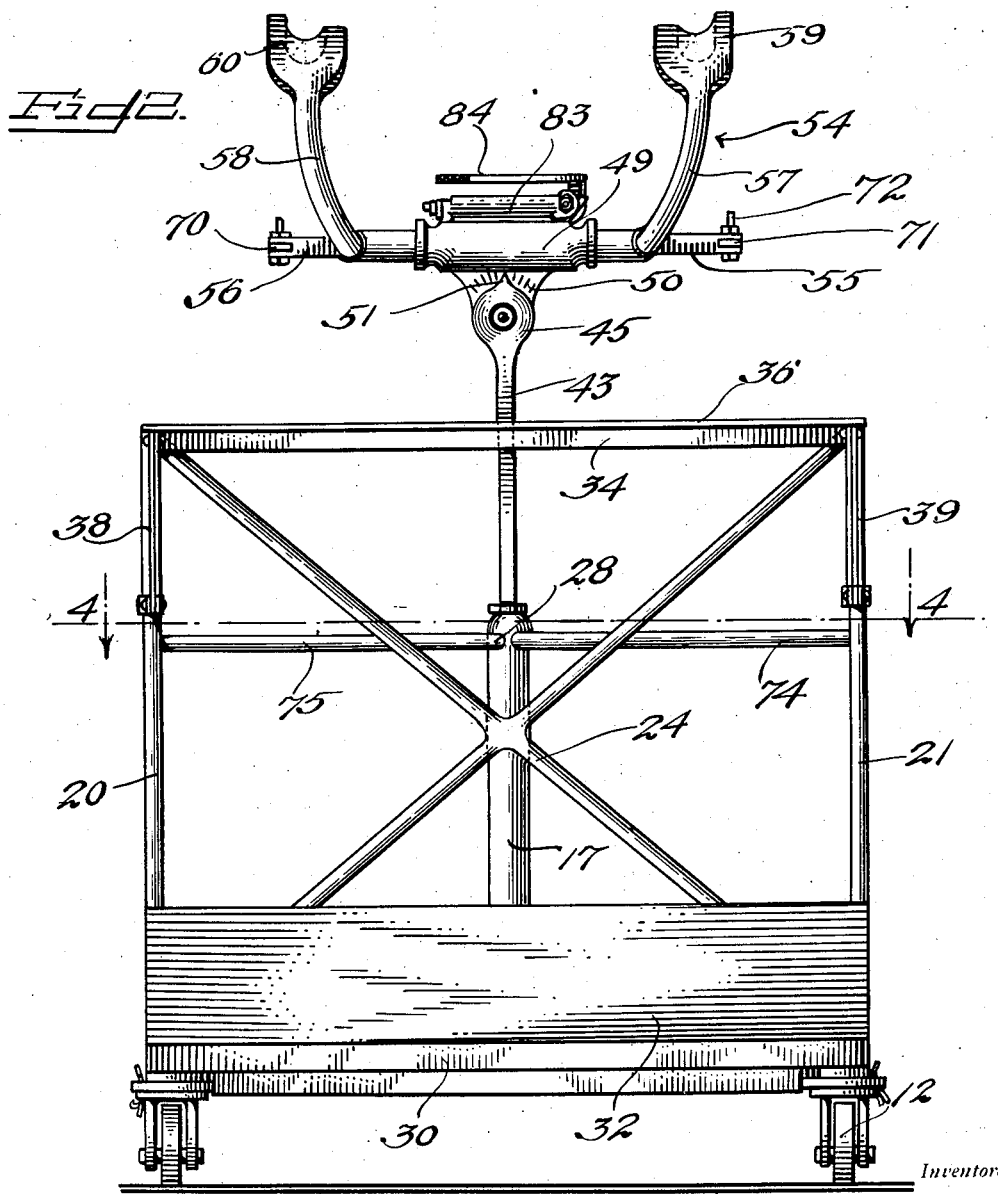

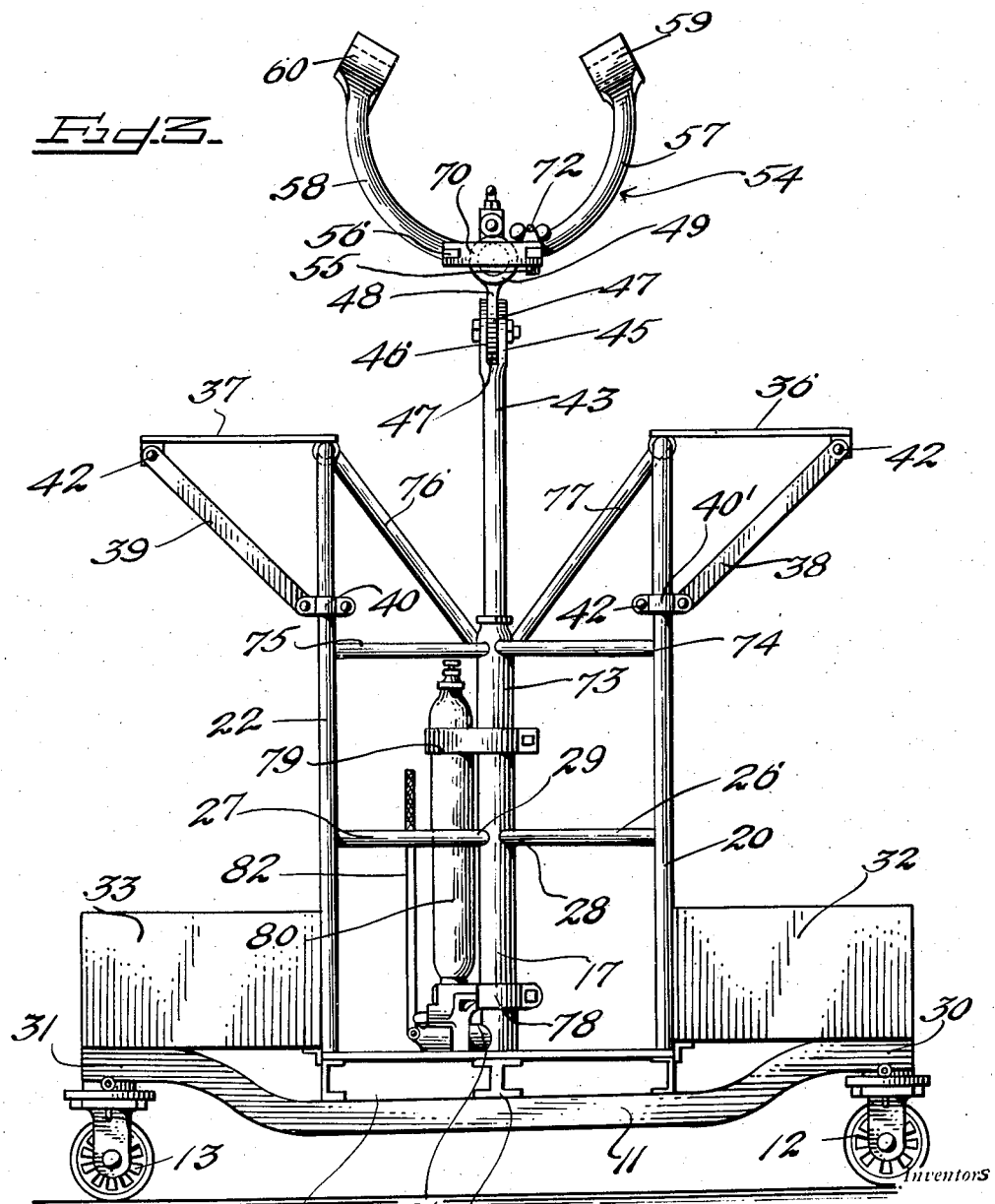

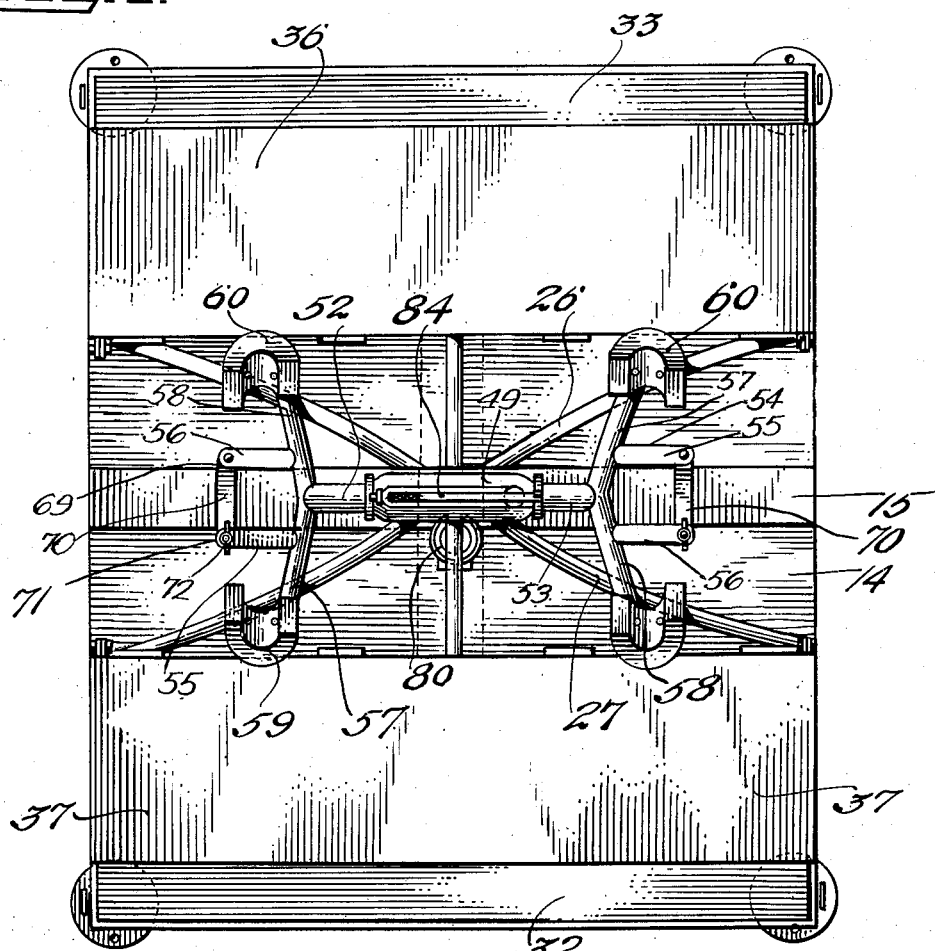
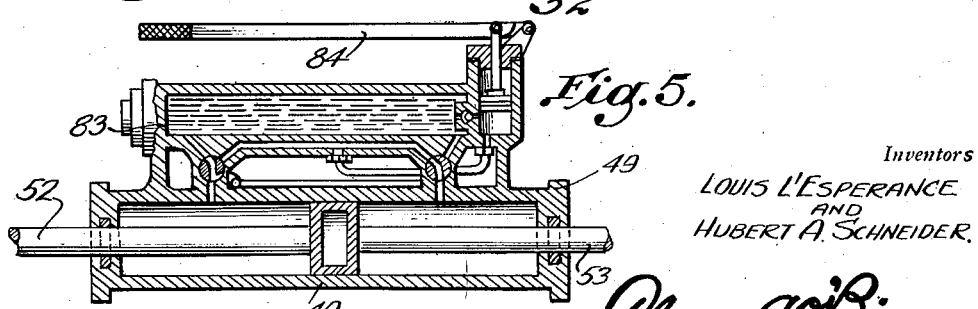

Patented May 3, 1949

2,468,884

UNITED STATES PATENT OFFICE 2,468,884

PROPELLER DOLLY

Louis L'Esperance and Hubert A. Schneider,
Madison, Wis.

Application May 12, 1945, Serial No. 593,404

4 Claims. (Cl. 214—1)

This invention relates to airplane maintenance equipment and has for its object to provide a device for handling propellers in placing them on or removing them from a motor shaft.

Another object of the invention is to provide means for handling a plurality of propellers and positioning the same relative to a motor shaft.

A further object of the invention is to provide means for moving, lifting vertically and horizontally shifting a propeller.

Another object of this invention is to provide in a single unit a carriage, a support for a plurality of propellers, means for raising the same, aligning them with the position of a motor shaft and shifting them onto the shaft.

A still further object of the invention is to provide in a dolly or truck means for mechanically handling propellers to place or remove them from a propeller shaft together with tool and equipment chests and workmen's platforms.

Other features and advantages will become more readily apparent from the following description and the accompanying illustrative drawings in which:

Figure 2 is a side elevational view thereof,

Figure 3 is an end elevational view of the invention, and

Figure 4 is a top plan view thereof.

Figure 5 is an enlarged sectional-elevational view of the cylinder and pump mechanism shown in Figure 2.

Figure 1:
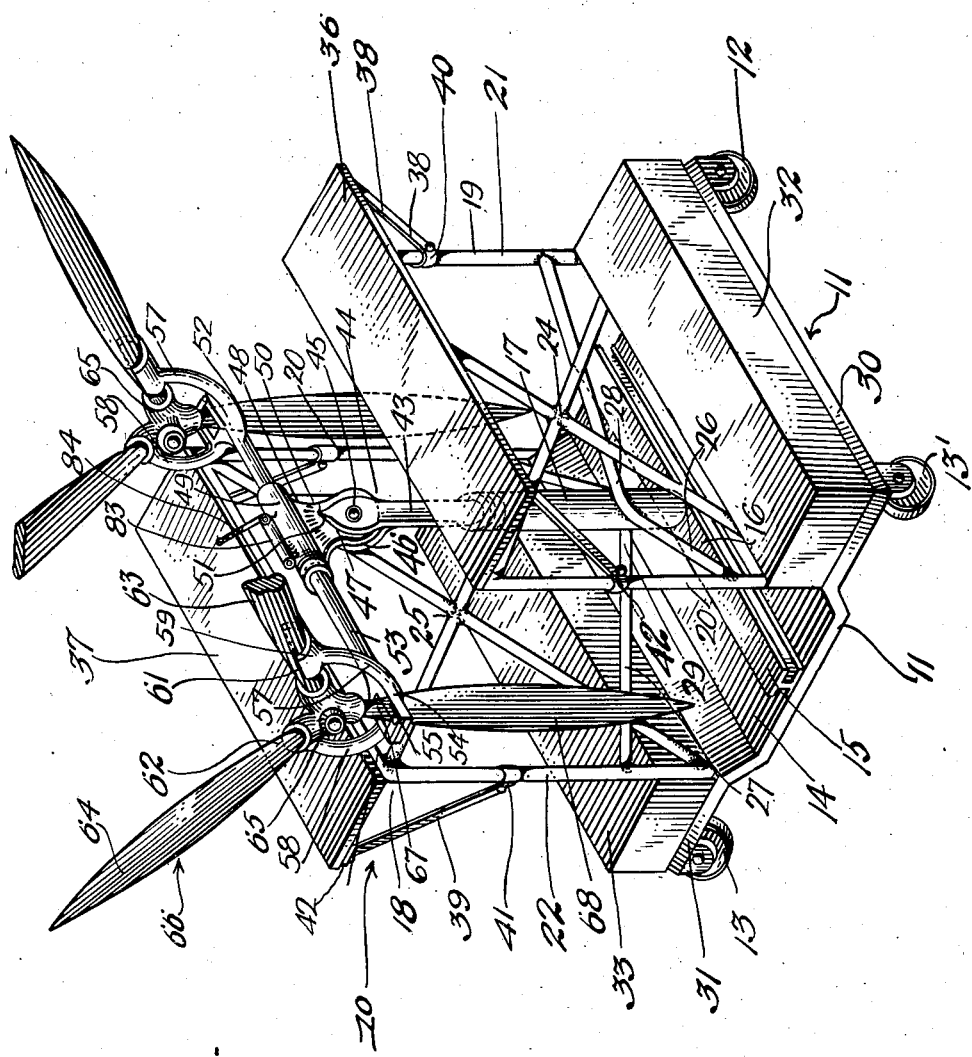
Figure 1 is a perspective view of our device.

In the accompanying drawings and in the specification to follow the same reference characters indicate the same parts, in which 10, has reference to our invention in its entirety and in which 11, is a platform mounted upon preferably ball bearing castor wheels 12, 13, etc. in order that the device may be very easily propelled and guided into an exact desired position relative to an airplane. The platform is provided with a relatively wide longitudinal channel 14, extending throughout the length thereof. Mounted centrally along this channel is an I-beam 15, over the center 16, of which is mounted a hydraulic or other fluid cylinder 17, relative to which more will be said later on.

Mounted upon the bottom 11, of the truck, just to each side of said channel 14, is a pair of inverted U-frame members 18 and 19, the respective legs 20 and 21, 22 and 23, of which are connected by cross braces 24 and 25, and also connecting the respective U-member legs are braces 26 and 27, respectively which are centrally bent in as at 28 and 29, to support the said cylinder 17, as well as further brace the members 18 and 19.

Upon the wings 30 and 31, of the member 11, are provided a tool chest 32, and parts and equipment chest 33. Connected to the horizontal bars 34 and 35, respectively of the U-members 18 and 19, are outwardly projecting platforms 36 and 37, upon which mechanics may sit or stand when removing or mounting a propeller. These platforms are supported on the outer edges by braces 38 and 39, pivoted to collars 40 and 41, whereby if desired the platforms may be swung down by releasing the wing nuts 42.

The cylinder 17, is a fluid lift provided with a piston rod 43, having a bifurcated head 44, between the disks 45 and 46, on which is pivotally mounted a similar disk 47, forming a depending part of a tongue 48, fixed to a horizontally disposed cylinder 49. The member 48, has stamped thereon an incline scale 50, to which the indice hand 51, of disk 45, points, whereby the required angular position of member 49, may readily be adjusted.

Operating within the cylinder 49, are a pair of oppositely movable piston rods 52 and 53, each having an enlarged bifurcated head 54, with spaced arms 55 and 56. Projecting from the head in opposite directions are upwardly curved segmental arms 57 and 58, terminating in spaced apart oppositely inclined semi-cylindrical heads 59 and 60, adapted to receive the shanks 61 and 62, of propeller blades 63 and 64, projecting from the hub 65, of a propeller 66. The arms 57 and 58, are so located as to bring the shank 67, of blade 68, between the said arms 55 and 56, of head 54. Pivoted to the terminal 69, of arm 56, is a cross latch 70, detachably connected to the end 71, of arm 55, by a pin 72, whereby the propeller 66, may be securely held to said head 54.

The upper end 73, of cylinder 17, is secured by braces 74, 75, 76 and 77. It is, of course, obvious that the length of the cylinder 17, and its piston 43, will depend upon the height to which a propeller is to be lifted. Attached by straps 78 and 79, to the cylinder 17, is a pump 80, having a connection 81, with the bottom of the cylinder and which pump is operated by a lever 82. The cylinder 49, has mounted thereon a pump 83, actuated by a handle 84. The cylinder 49, and pistons 52, and 53, are of a length to shift the propeller carried by the device a suitable distance to seat the propeller directly upon the shaft to which it is to be attached or to receive them for such shafts.

The operation of the device is very simple: The propellers are mounted upon the dolly, which is pushed or drawn to the airplane to which they are to be attached and positioned directly under the motor shaft upon which a propeller is to be attached, then the angular position of said shaft is taken and the cylinder piston 52 or 53, is set to the exact same angle through means of the incline scale 50, then the pump 80, operated to raise piston 43, to proper height, then pump 83, is operated to move the propeller directly upon said motor shaft (not shown).

From the above it will be obvious that we have provided a propeller mounting or dismounting device which will save much time, labor and expense, but which will relieve the mechanics of much hand and laborious work.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described our invention that which we claim as new and desire to procure by Letters Patent is:

1. Apparatus for use in handling aircraft propellers which includes a mobile platform having a longitudinal trough in its bottom, a frame rising from the platform adjacent each longitudinal side edge of the trough, a shelf at the upper edge of each side frame adapted to extend outwardly therefrom to support workmen engaged in mounting and demounting propellers with relation to the engines mounted in aircraft, a power lift mounted on the platform intermediate the sides and ends of the trough to move vertically between the frames and propeller cradles carried by the power lift and movable therewith between the ends of the frames.

2. Apparatus for use in handling aircraft propellers which includes a mobile platform having a longitudinal trough in its bottom, a frame rising from the platform adjacent each longitudinal side edge of the trough, a shelf at the upper edge of each side frame adapted to extend outwardly therefrom to support workmen engaged in mounting and demounting propellers with relation to the engines mounted in aircraft, a power lift mounted on the platform intermediate the sides and ends of the trough to move vertically between the frames and propeller cradles carried by the power lift and movable therewith between the ends of the frames and means carried by the power lift to move the cradles toward or away from its axis.

3. Apparatus for use in handling aircraft propellers which includes a mobile platform having a longitudinal trough in its bottom, a frame rising from the platform adjacent each longitudinal side edge of the trough, a shelf at the upper edge of each side frame adapted to extend outwardly therefrom to support workmen engaged in mounting and demounting propellers with relation to the engines mounted in aircraft, a power lift mounted on the platform intermediate the sides and ends of the trough, a carriage actuated by the power lift and movable vertically between the frames and a propeller cradle at each end of the carriage for movement therewith adjacent the ends of the frame.

4. Apparatus for use in handling aircraft propellers which includes a mobile platform having a longitudinal trough in its bottom, a frame rising from the platform adjacent each longitudinal side edge of the trough, a shelf at the upper edge of each side frame adapted to extend outwardly therefrom to support workmen engaged in mounting and demounting propellers with relation to the engines mounted in aircraft, a power lift mounted on the platform intermediate the sides and ends of the trough, a carriage actuated by the power lift and movable vertically between the frames, a propeller cradle at each end of the carriage for movement therewith adjacent the ends of the frame and means carried by the carriage to move the cradles toward or away from the vertical axis of the carriage.

LOUIS L'ESPERANCE.
HUBERT A. SCHNEIDER.

REFERENCES CITED

The following references are of record in the file of this patent:

UNITED STATES PATENTS

| Number | Name | Date |
| --- | --- | --- |
| 333,114 | Dougine | Dec. 29, 1885 |
| 725,312 | Anderson | Apr. 14, 1903 |
| 827,354 | Fisher | July 31, 1906 |
| 1,300,371 | French | Apr. 15, 1919 |
| 1,367,907 | Andrews | Feb. 8, 1921 |
| 1,414,970 | Nelson | May 2, 1922 |
| 1,475,552 | Peterson | Nov. 27, 1923 |
| 1,697,117 | Hilstad | Jan. 1, 1929 |
| 1,990,491 | Johnson | Feb. 12, 1935 |
| 2,335,692 | Murray | Nov. 30, 1943 |
| 2,365,151 | Solomon | Dec. 19, 1944 |
| 2,375,104 | Heitshu | May 1, 1945 |
| 2,395,411 | Kittel | Feb. 26, 1946 |

FOREIGN PATENTS

| Number | Country | Date |
| --- | --- | --- |
| 10,793 | Great Britain | May 11, 1898 |